(12) United States Patent
Ando et al.

(10) Patent No.: US 6,505,874 B2
(45) Date of Patent: Jan. 14, 2003

(54) LUGGAGE COMPARTMENT FOR VEHICLE

(75) Inventors: Hiroshi Ando, Kariya (JP); Hideya Nakanou, Kariya (JP); Toshimitsu Watanabe, Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 09/795,114

(22) Filed: Mar. 1, 2001

(65) Prior Publication Data

US 2001/0022451 A1 Sep. 20, 2001

(30) Foreign Application Priority Data

Mar. 17, 2000 (JP) .......................... 2000-076893

(51) Int. Cl.$^7$ .............. B60R 5/04; B60R 7/02; B62D 25/24
(52) U.S. Cl. ................ 296/37.16; 226/37.8; 226/37.16
(58) Field of Search ................ 296/37.1, 37.8, 296/37.14, 37.16, 24.1

(56) References Cited

U.S. PATENT DOCUMENTS

| | | | | |
|---|---|---|---|---|
| 4,848,826 A | * | 7/1989 | Kuwabara et al. | 296/37.16 |
| 5,080,417 A | * | 1/1992 | Kanai | 296/37.14 |
| 5,372,289 A | * | 12/1994 | Dachicourt | 296/37.1 |
| 5,441,183 A | * | 8/1995 | Frenzel | 296/37.1 |
| 5,632,520 A | * | 5/1997 | Butz | 296/24.1 |
| 5,636,890 A | * | 6/1997 | Cooper | 296/37.1 |
| 5,799,845 A | * | 9/1998 | Matsushita | 296/37.2 |
| 6,050,202 A | * | 4/2000 | Thompson | 296/37.16 |
| 6,102,464 A | * | 8/2000 | Schneider et al. | 296/37.3 |
| 6,247,741 B1 | * | 6/2001 | Seel et al. | 296/37.14 |
| 6,290,277 B1 | * | 9/2001 | Spykerman et al. | 396/24.1 |
| 6,290,278 B1 | * | 9/2001 | Loveland | 296/39.1 |
| 2002/0000733 A1 | * | 1/2002 | Ryan | 296/37.1 |
| 2002/0070574 A1 | * | 6/2002 | Carlsson et al. | 296/37.14 |

FOREIGN PATENT DOCUMENTS

| | | | | |
|---|---|---|---|---|
| DE | 3512974 | * | 10/1985 | 296/24.1 |
| DE | 3738931 | * | 6/1989 | 296/37.1 |
| DE | 3901354 | * | 7/1990 | |
| DE | 4014871 | * | 11/1990 | 296/37.16 |
| DE | 4121378 | * | 1/1992 | 296/37.16 |
| DE | 4432369 | * | 3/1996 | |
| JP | 57-29446 U | | 2/1982 | |
| JP | 60-185653 | * | 9/1985 | 296/37.1 |
| JP | 61-75036 | * | 4/1986 | 296/37.16 |
| JP | 61-122048 | * | 6/1986 | 296/37.16 |
| JP | 61-193949 | * | 8/1986 | 296/37.16 |
| JP | 61-179182 U | | 11/1986 | |
| JP | 61-249850 | * | 11/1986 | 296/37.16 |
| JP | 8-26035 | | 1/1996 | |
| JP | 8-119039 | | 5/1996 | |
| JP | 10-287185 | | 10/1998 | |

* cited by examiner

*Primary Examiner*—D. Glenn Dayoan
*Assistant Examiner*—Hilary Gutman
(74) *Attorney, Agent, or Firm*—Oliff & Berridge, PLC

(57) ABSTRACT

A luggage compartment structure allows a tray to be detachably placed on a floor surface of the luggage compartment on which a luggage mat is spread, or detachably placed on the undersurface of an upper back panel of the luggage compartment. Further, the luggage compartment structure allows the tray to be accommodated in a recessed storage portion provided in a floorboard member. As a result, the tray can be effectively placed on, over or under the luggage mat of the luggage compartment as required to accommodate various luggage loading configurations.

15 Claims, 17 Drawing Sheets

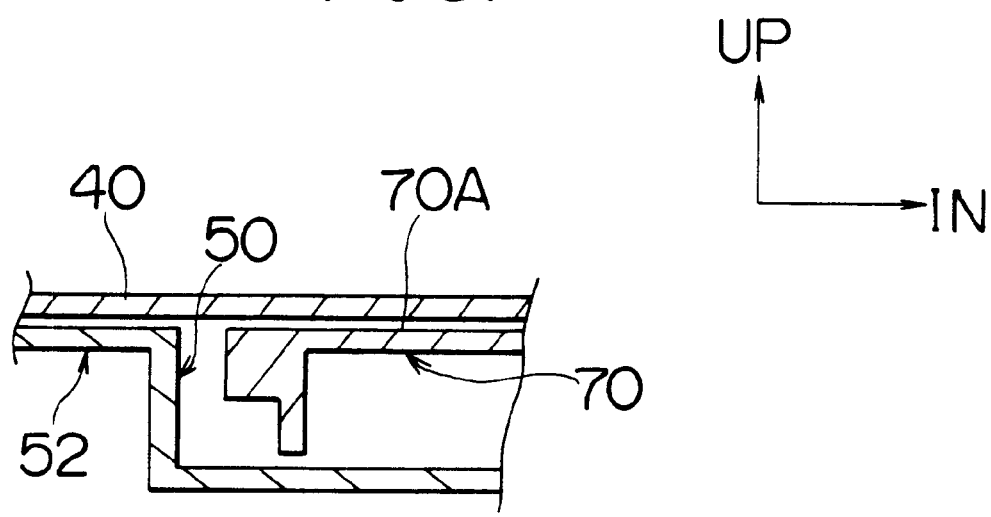
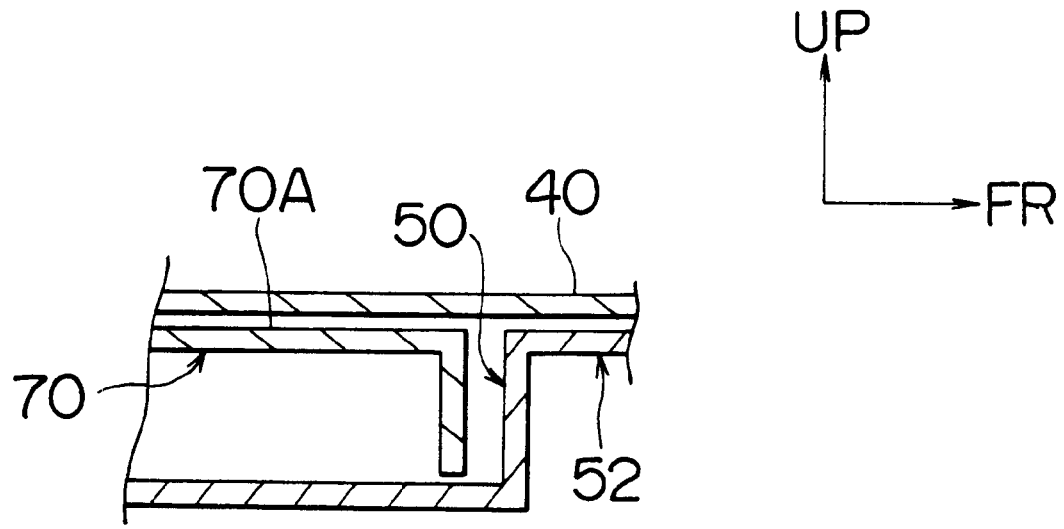

LUGGAGE COMPARTMENT FOR VEHICLE

BACKGROUND OF THE INVENTION

1. Field of Invention

The invention relates to a luggage compartment structure for a vehicle, applicable to vehicles such as a car and the like.

2. Description of Related Art

An example of a luggage compartment structure applicable to vehicles such as a car is disclosed in Japanese Patent Laid-Open Publication No. 8-26035.

As shown in FIG. 20, a luggage compartment structure 100 for a vehicle includes a tray 102. On a sidewall 102A of this tray 102 in the rear of the vehicle body, an opening/closing wall 104 allowing only the upper part of the sidewall 102A to open and close is provided. By closing this opening/closing wall 104, the storage function of the tray 102 can be ensured. Moreover, by opening the opening/closing wall 104, loading and unloading of a load can be facilitated. Japanese Patent Laid-Open Publication No. 10-287185 also discloses related art.

In such a luggage compartment structure for a vehicle, however, the tray is placed or secured in a predetermined location, for example, on or under a luggage mat. As a result, by securing the tray in one location within the luggage compartment that is of limited space, the tray which is placed or secured on the luggage mat becomes an obstacle when placing larger luggage in the luggage compartment. On the other hand, when the tray is placed under the luggage mat, luggage having a depth greater than that of the tray must inevitably be placed on the luggage mat because such luggage cannot be placed in the tray.

A structure in which the tray on the luggage mat is removed from the vehicle as required is also conceivable. In consideration of convenience, however, such a structure is not practicable.

SUMMARY OF THE INVENTION

It is an object of the invention to provide a luggage compartment structure for a vehicle, in which a tray can be effectively placed on and under a luggage mat of a luggage compartment as required.

According to the first aspect of the invention, the luggage compartment structure for a vehicle includes a detachable tray having an opening on one side, a floorboard member provided below an undersurface of a luggage mat, the floorboard member having a recessed storage portion that can accommodate the detachable tray, a luggage compartment having an upper back panel, and a lid member positionable to close an opening of the recessed storage portion so as to provide a substantially flat upper support surface of the floorboard member above the recessed storage portion. The tray is detachably placeable on any of the undersurface of the upper back panel of the luggage compartment, on a floor surface on which the luggage mat is spread, and within the recessed storage portion.

Therefore, according to this structure, the tray can be effectively placed on or under the floor as required while the opening of the recessed storage portion can be closed by the lid member to provide a flat floor surface when luggage is to be placed on the upper surface of the storage portion of the floor member, thereby allowing stable placement of the luggage.

In the above aspect, the lid member can be constituted so as to include a base plate on one side and a partition plate perpendicularly extending from the base plate which can be accommodated upside down in the recessed storage portion of the floorboard member or in the tray.

Therefore, in addition to the content of the first aspect, by placing the partition plate in the recessed storage portion of the floorboard member or the tray with the base plate being oriented so as to be up, the upper face or floor surface of the tray can be made flat. Moreover, the partition plate can be placed in the recessed storage portion of the floorboard member or in the tray so as to allow the space of the storage portion of the floorboard member or the tray to be divided into a plurality of small spaces, thereby allowing the efficient placement of small articles.

Moreover, in the first aspect, the lid member can be constituted so as to include a small tray having an opening on one side, which can be accommodated in the recessed storage portion of the floorboard member or within the tray in an upside down manner.

Therefore, in addition to the content of the first aspect, the partition plate can be placed upside down in the storage portion of the floorboard member or the tray such that the upper face or floor surface of the tray can be made flat. Furthermore, the small tray and the tray can be used individually or combined, allowing various storage configurations to be selected.

In the first aspect, the lid member can be a base plate of the tray which is accommodated upside down in the storage portion of the floorboard member.

Therefore, in addition to the content of the first aspect, the tray can be placed upside down in the storage portion of the floorboard member so that the opening of the recessed storage portion is closed by the base plate of the tray so the floor surface is substantially flat, thereby allowing stable placement of luggage.

BRIEF DESCRIPTION OF THE DRAWINGS

FIG. 18 is an enlarged cross-sectional view taken along line XVIII—XVIII in FIG. 17 when the tray is assembled;

FIG. 19 is an enlarged cross-sectional view taken along line XIX—XIX in FIG. 17 when the tray is assembled.

DETAILED DESCRIPTION OF PREFERRED EMBODIMENTS

Figure 1:
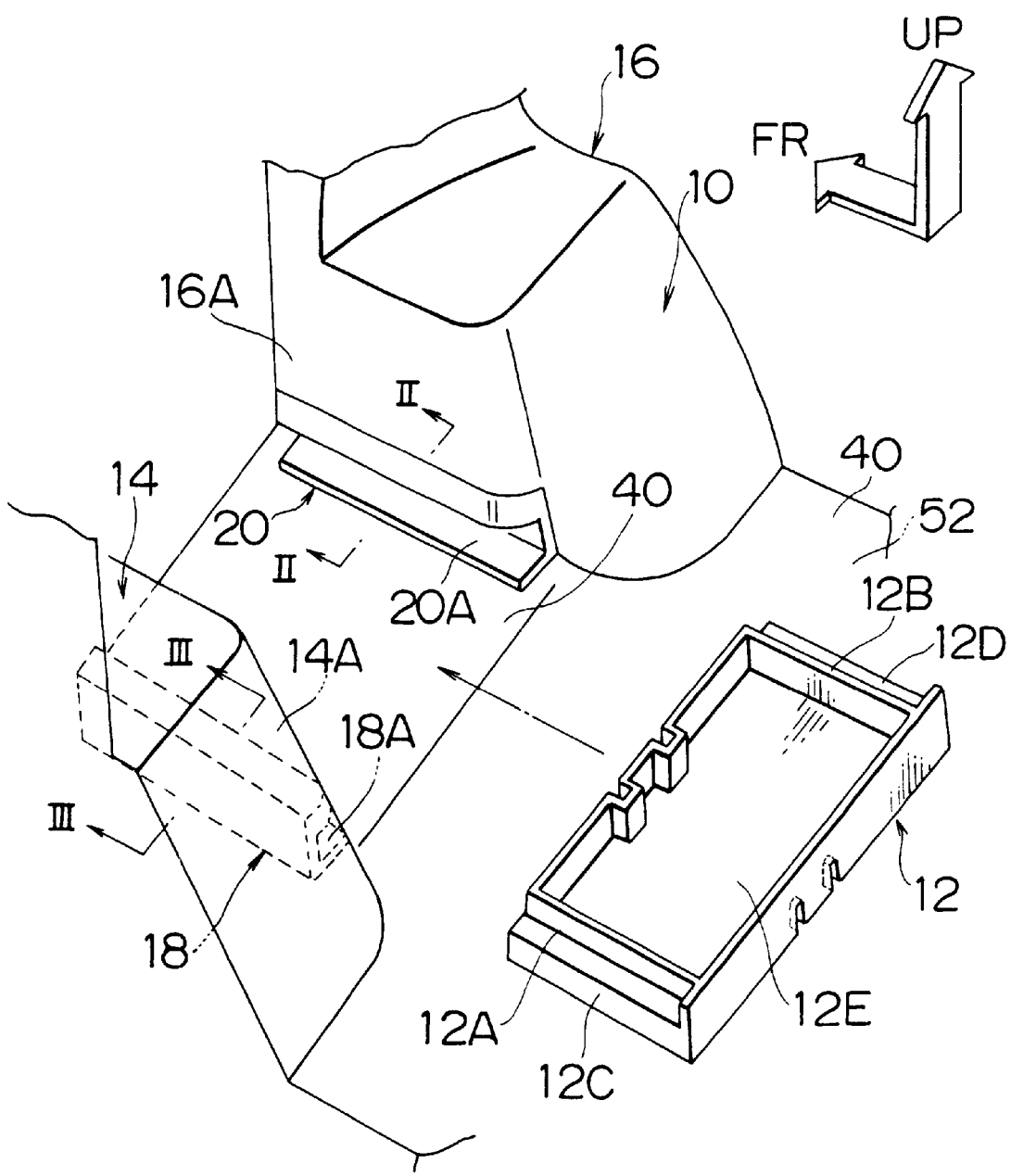
FIG. 1 is a perspective view showing an example of use of a luggage compartment structure for a vehicle according to a first embodiment of the invention, as viewed from behind at an angle to the vehicle.

Hereinafter, a first embodiment of a luggage compartment structure for a vehicle according to the invention will be described with reference to FIGS. 1 through 10.

In the drawings, arrow FR indicates a forward direction of a vehicle, arrow IN indicates an inner lateral direction through the vehicle, and arrow UP indicates an upward direction through the vehicle body.

As shown in FIG. 1, in the luggage compartment structure for a vehicle according to this embodiment, a tray 12 is attached in a luggage compartment 10 provided in the rear of the vehicle. The tray 12 is in the shape of a box having an opening upper part. On the lower parts of a wall 12A and a wall 12B on the right and left sides, guides 12C and 12D extending along in the longitudinal direction (forward and backward direction of the vehicle) of the walls 12A and 12B are formed in a protruding manner. Meanwhile, on the lower parts of counter surfaces 14A and 16A of a left hand (hereinafter, abbreviated as LH) 14 and a right hand (hereinafter, abbreviated as RH) 16 of luggage side trims (hereinafter, referred to simply as trims) respectively constituting right and left walls of the luggage compartment 10, a trim LH 18 and a trim RH 20 are respectively provided in the forward and backward direction of the vehicle. In the respective opposing parts of the trim LH 18 and the trim RH20, guide rails 18A and 20A extending in the forward and backward direction of the vehicle are formed.

Figure 2:
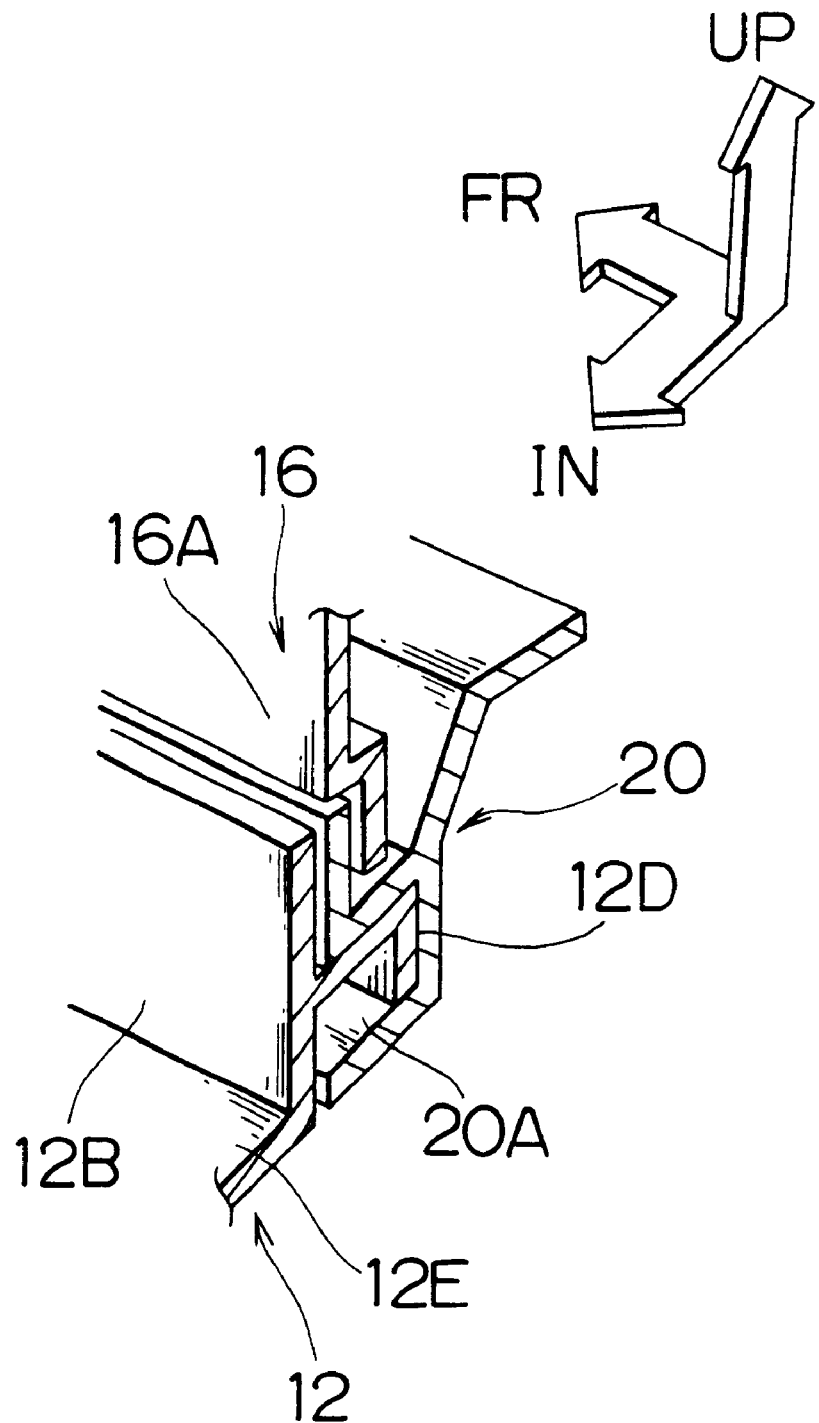
FIG. 2 is an enlarged cross-sectional view taken along line II—II in FIG. 1 when the tray is assembled.
Figure 3:
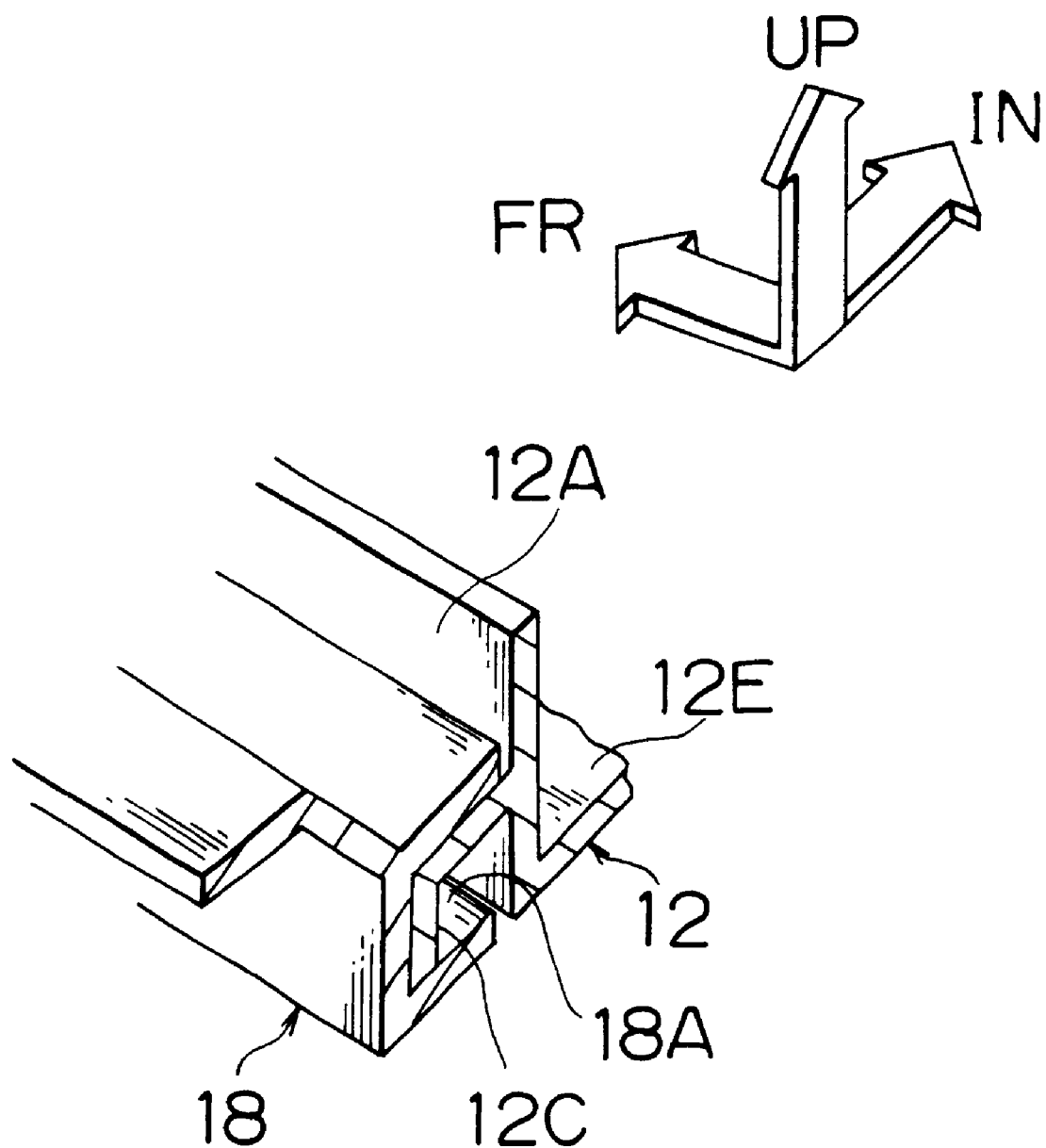
FIG. 3 is an enlarged cross-sectional view taken along line III—III in FIG. 1 when the tray is assembled.

As shown in FIG. 2, the guide rail 20A of the trim RH 20 has a U-shaped cross-section which opens in the lateral direction of the vehicle. This shape permits the guide 12D of the tray 12 to be inserted into the U-shaped cross-section. The guide 12D has an L-shaped cross section whose outer part in the lateral direction of the vehicle is downwardly bent. Furthermore, as shown in FIG. 3, the guide rail 18A of the trim LH 18 and the guide 12C in the tray 12 have the same structure as those of the guide rail 20A and the guide 12D, respectively.

Figure 4:
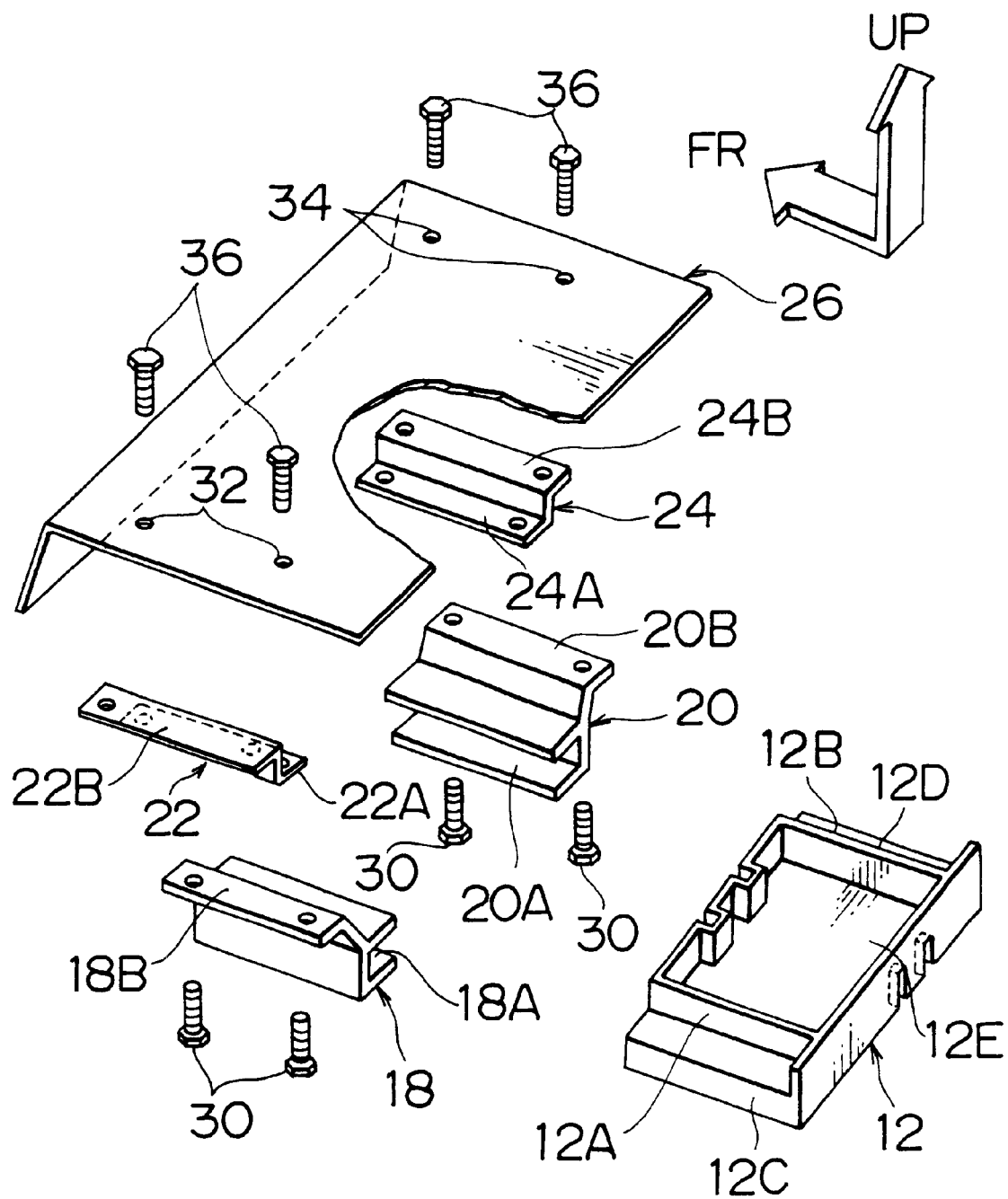
FIG. 4 is an exploded perspective view showing a part of the luggage compartment structure for a vehicle according to the first embodiment of the invention, as viewed from behind at an angle to the vehicle.

In this embodiment of the invention, as shown in FIG. 4, the trims LH18 and RH20 are fixed through brackets LH22 and RH24 in the vicinities of the right and left edges on the undersurface of the upper back panel 26. Specifically, attachment flanges 18B and 20B formed on the respective upper edges of the trims LH18 and RH20 in the outer lateral direction of the vehicle are secured with securing members 30 such as bolts to flanges 22A and 24A formed on the lower part of the brackets LH22 and RH24 in the inner lateral direction of the vehicle. Flanges 22B and 24B formed on the upper parts of the brackets LH22 and RH24 in the outer lateral direction of the vehicle are secured with securing members 36 such as bolts to the upper back panel 26 through attachment holes 32 and 34 respectively formed near the right and left edges thereof. The interval between the guide rail 18A and the guide rail 20A in FIG. 1 is equal to that in FIG. 4.

Figure 5:
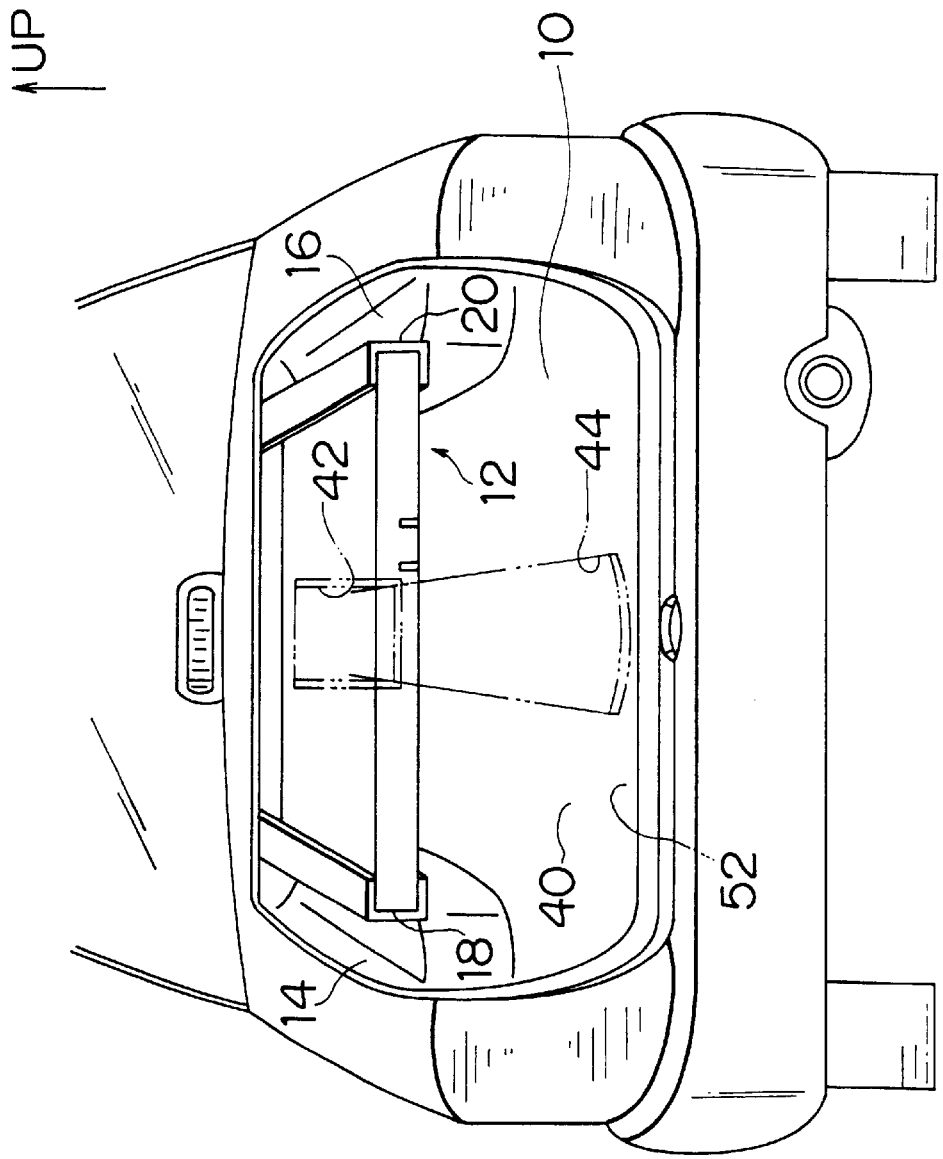
FIG. 5 is a diagram showing the luggage compartment structure for a vehicle according to the first embodiment of the invention, as viewed from behind the vehicle.
Figure 6A:
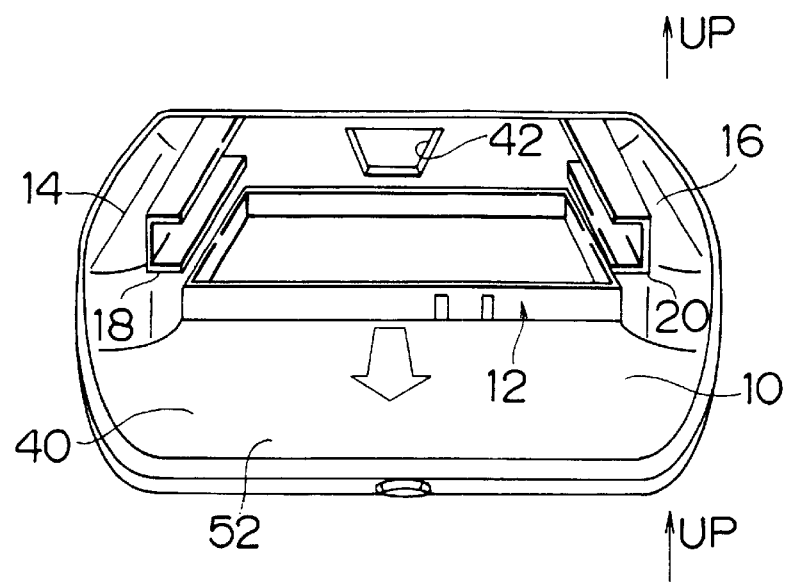
FIG. 6A through FIG. 6C are schematic diagrams showing an example of use of the luggage compartment structure for a vehicle according to the first embodiment of the invention, as viewed from behind the vehicle.

Therefore, according to this structure, as shown in FIG. 5, the tray 12 can be detachably placed so as to be hung from the undersurface of the upper back panel 26 (not shown) of the luggage compartment 10. In addition, as shown in FIG. 6A, the tray 12 can be detachably placed on the floor surface of the luggage compartment 10 on which a luggage mat 40 is spread.

Figure 6B:
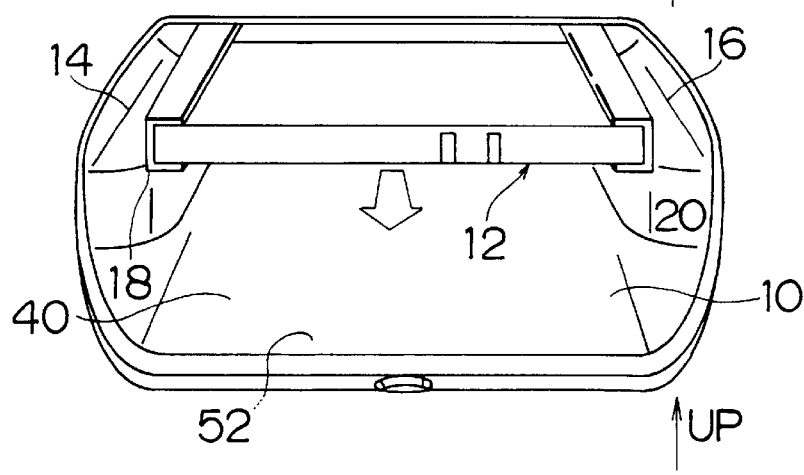

The following is a marked-up version of the amended paragraphs: As shown in FIGS. 5 and 6B, while the tray 12 is hung from the undersurface of the upper back panel 26 (not shown) of the luggage compartment 10, the tray 12 is positioned above an opening 42 formed in the luggage compartment 10 between the vehicle interior and the trunk, such as near the rear seat armrest, so that long luggage 44, a part of which is inserted into the opening 42, does not interfere with the tray 12.

Figure 6C:
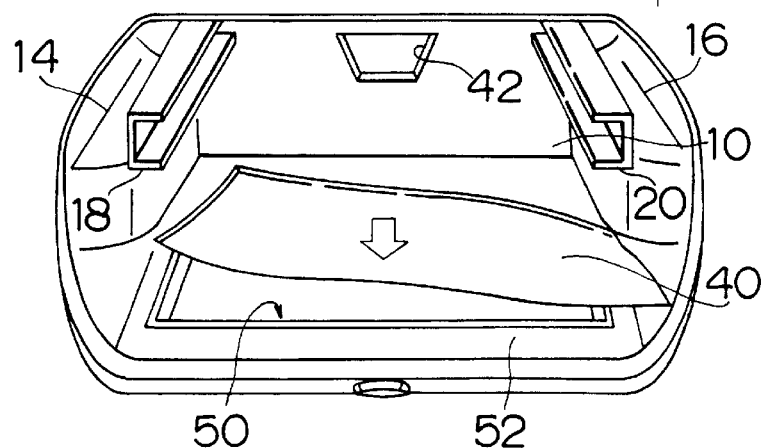
Figure 7:
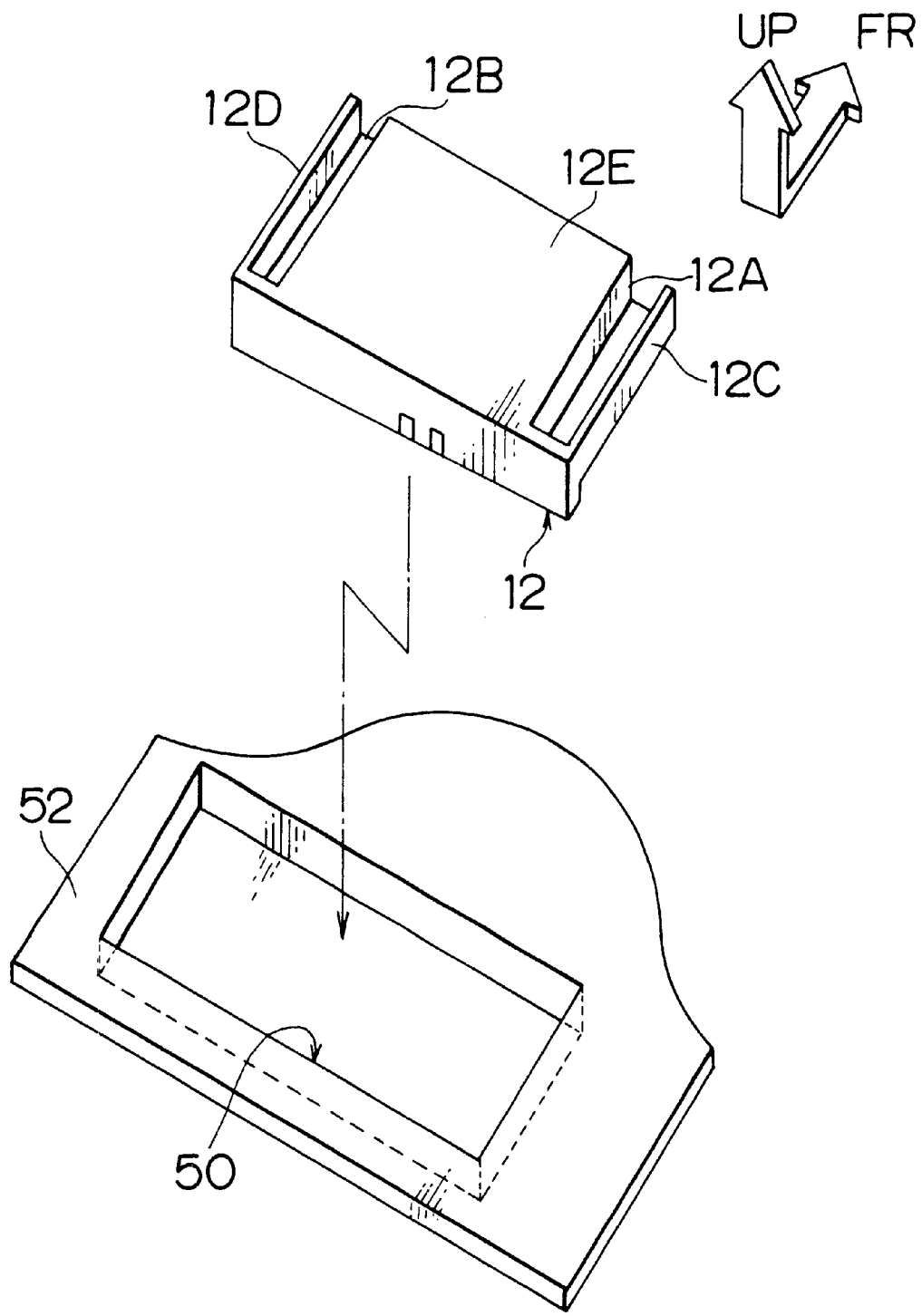
FIG. 7 is a perspective view showing an example of use of the luggage compartment structure for a vehicle according to the first embodiment of the invention, as viewed from behind at an angle to the vehicle.

In this embodiment, as shown in FIG. 6C, a storage portion (tool box) 50 for accommodating the tray 12 therein is provided. The storage portion is recessed in a floorboard member 52 contacting the undersurface of the luggage mat 40. Moreover, as shown in FIGS. 7 and 8, the tray 12 can be placed and accommodated in the recessed storage portion 50 from above.

Figure 8:
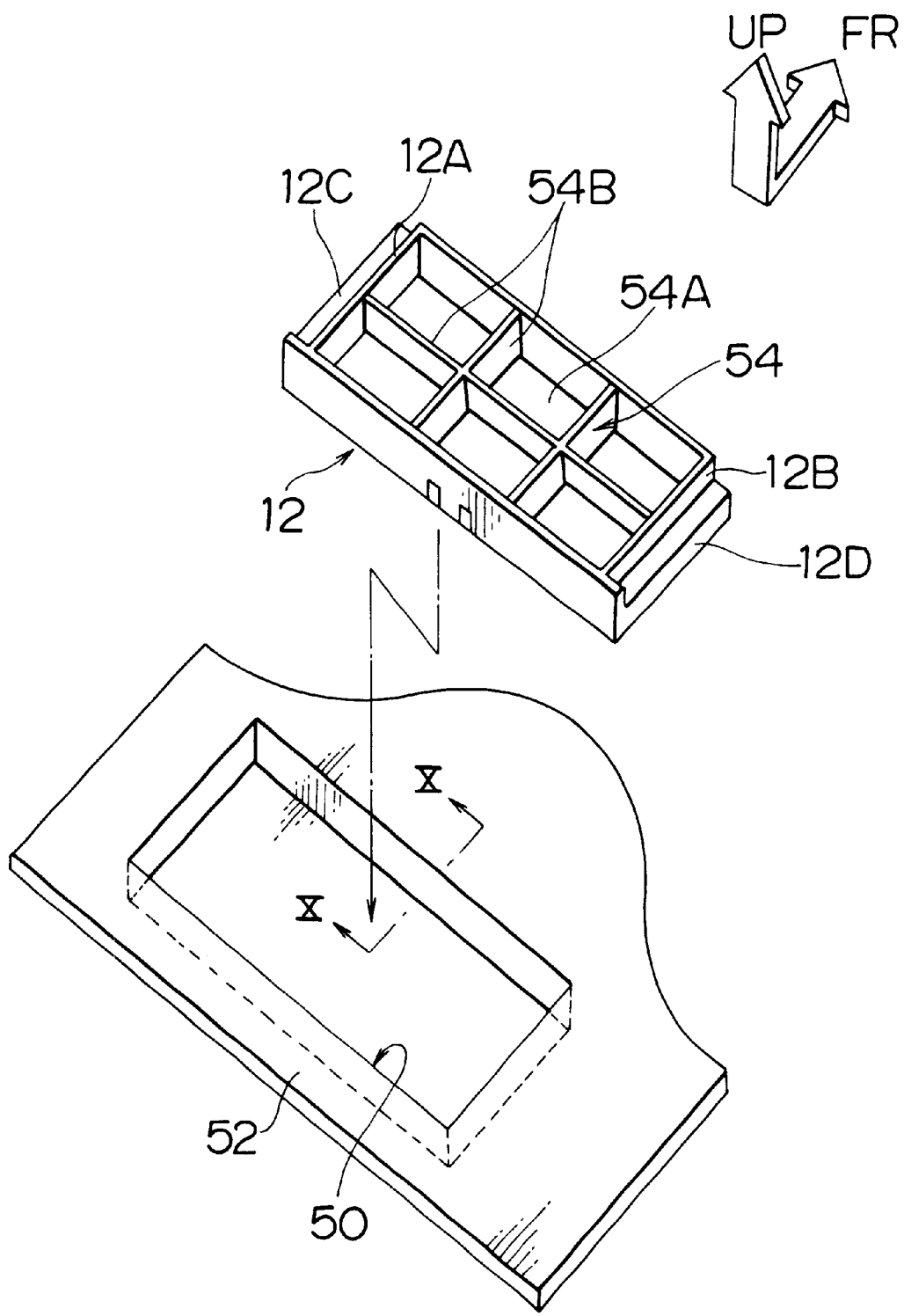
FIG. 8 is a perspective view showing an example of use of the luggage compartment structure for a vehicle according to the first embodiment of the invention, as viewed from behind at an angle to the vehicle.
Figure 9:
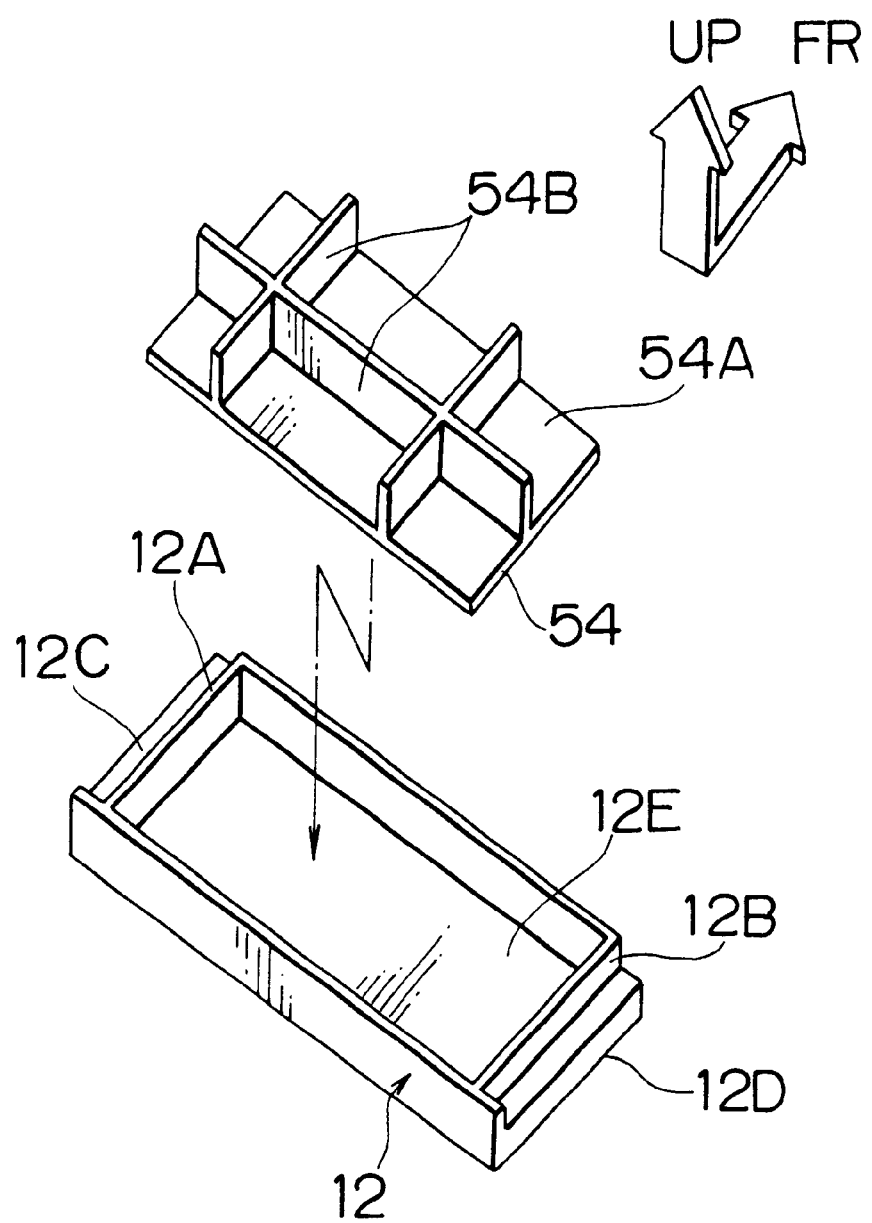
FIG. 9 is a perspective view showing an example of use of the luggage compartment structure for a vehicle according to the first embodiment of the invention, as viewed from behind at an angle to the vehicle.

As shown in FIGS. 8 and 9, a partition plate 54 can be inserted in the tray 12. The partition plate 54 is of a structure such that partition walls 54B are vertically placed on a base plate 54A. Thus, insertion of the partition plate 54 makes it possible to divide the space of the tray 12 into a plurality of small spaces for use.

Figure 10:
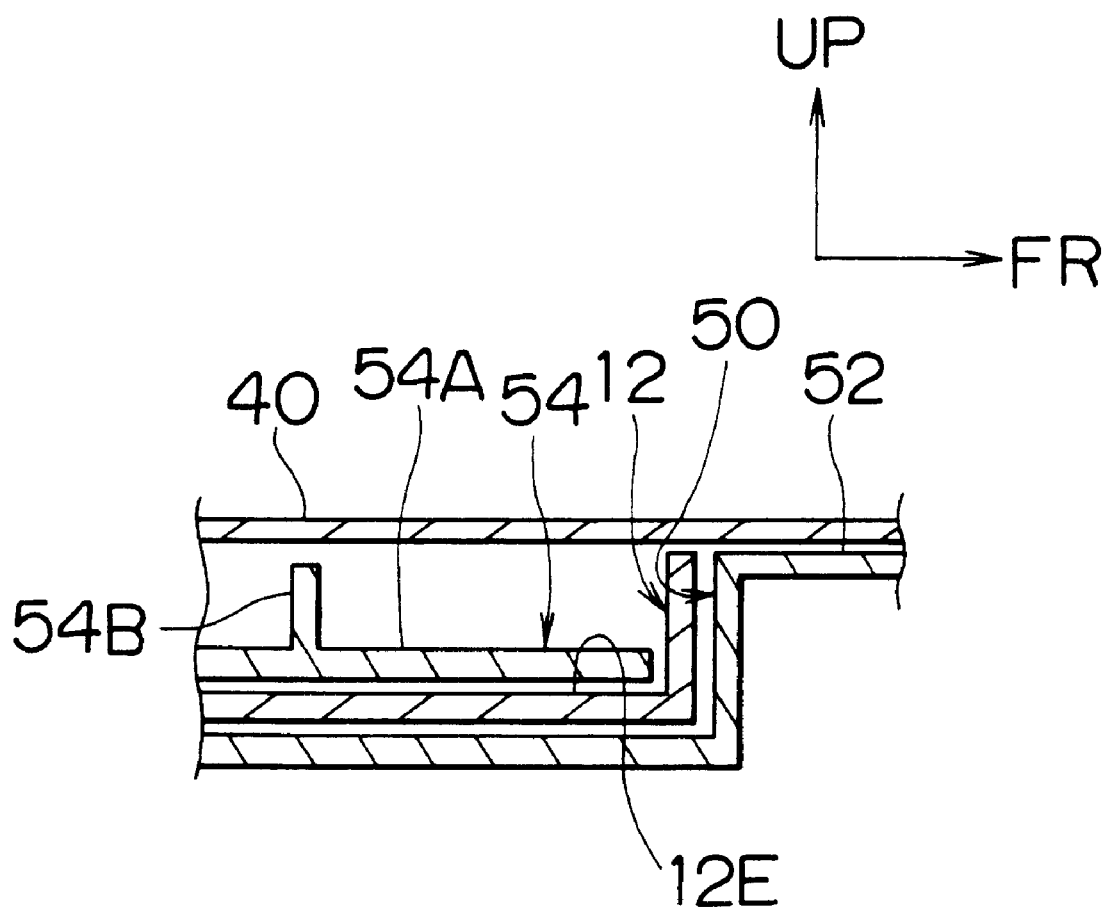
FIG. 10 is an enlarged cross-sectional view, taken along line X—X in FIG. 8 when the tray is assembled.

As shown in FIG. 10, the partition walls 54B of the partition plate 54 also serve as ribs to support the luggage mat 40 from below so as to prevent the luggage mat 40 from being damaged when the luggage mat 40, which is spread on the tray 12, is pressed from above.

Next, the use of this embodiment will be described.

In this embodiment, as shown in FIG. 6A, the tray 12 can be detachably placed on the floor surface of the luggage compartment 10 on which the luggage mat 40 is spread. In such a case, for example, luggage or car washing tools and so forth can be placed in the tray 12. In addition, luggage or the like placed in the tray 12 can be taken out from inside the vehicle through the opening 42 and can be replaced in the tray 12. As shown in FIG. 6B, the tray 12 can be detachably placed so as to be hung from the undersurface of the upper back panel 26 (not shown) of the luggage compartment 10. In this case, for example, a shirt or shoes can be placed in the tray 12. In addition, long luggage 44 (see FIG. 5) which is partially inserted into the opening 42 does not interfere with the tray 12. Furthermore, as shown in FIG. 6C, the tray 12 can be accommodated in the storage portion 50 that is provided recessed in the floorboard member 52. As a result, the tray 12 can be effectively placed on and under the luggage mat 40 of the luggage compartment 10 as required.

Moreover, in this embodiment, as shown in FIG. 8, the tray 12 including the partition plate 54 is accommodated in the recessed storage portion 50 provided in the floorboard member 52 so that the space of the tray 12 (or the storage portion 50) can be divided into a plurality of small spaces. Such a division allows efficient placement of small articles.

Also in this embodiment, by placing the partition plate 54 in the tray 12 (or the storage portion 50) with the base plate 54A oriented so as to be up, the upper face of the tray 12 (or the floor surface of the luggage compartment 10) can be made substantially flat, thereby allowing stable placement of luggage.

Furthermore in this embodiment, as shown in FIG. 7, the upside down placement of the tray 12 in the storage portion 50 allows the utilization of a base plate 12E of the tray 12 as a lid member, so that the luggage compartment 10 can have a flat floor surface. As a result, luggage can be stably placed while allowing conventional utilization of the space of the luggage compartment.

Next, a second embodiment of a luggage compartment structure for a vehicle according to the invention will be described with reference to FIGS. 11 through 13.

The same members as those of the first embodiment are designated by the same reference numerals, and the description thereof is omitted herein.

Figure 11:
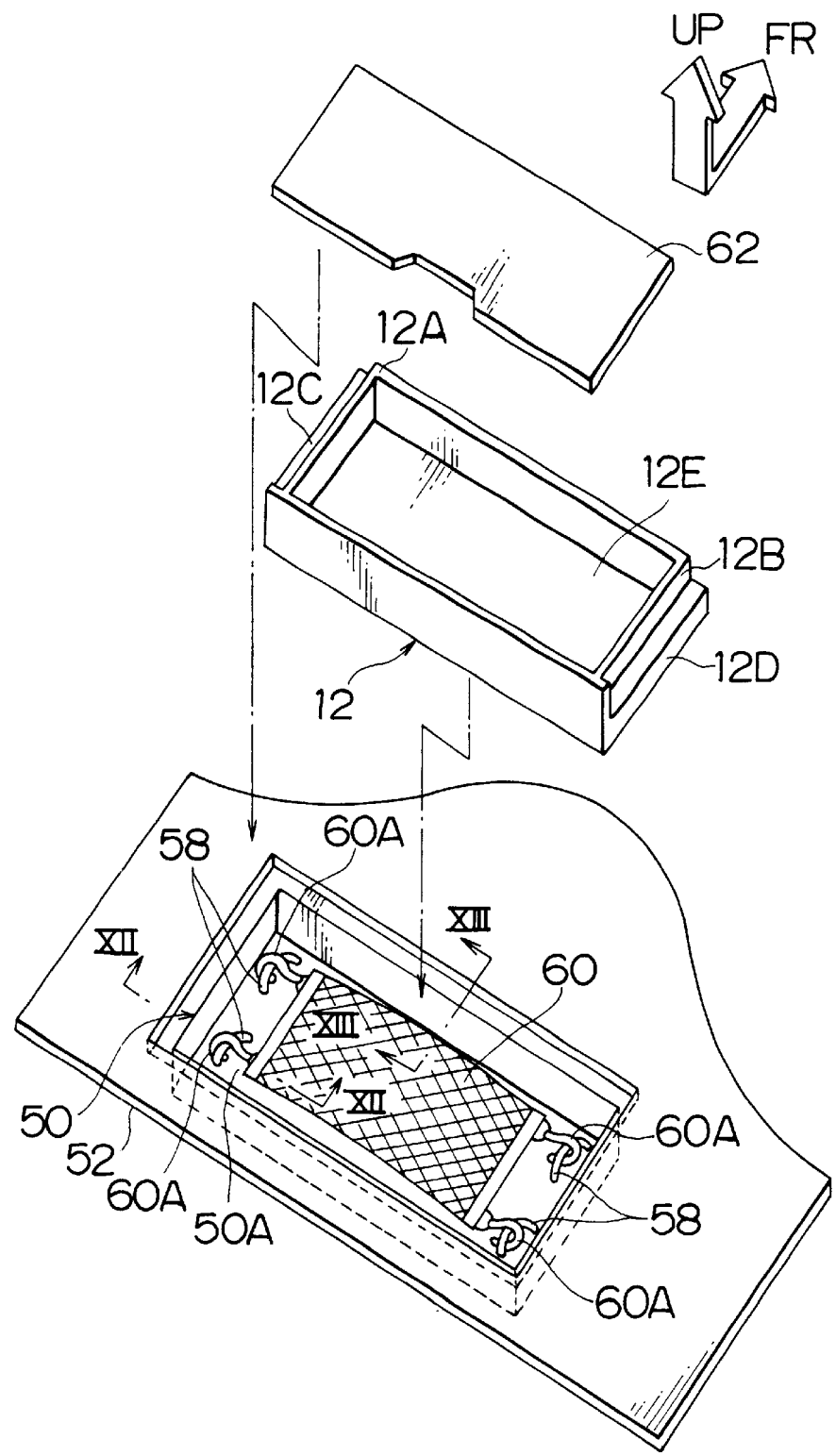
FIG. 11 is a perspective view showing an example of use of the luggage compartment structure for a vehicle according to a second embodiment of the invention, as viewed from behind at an angle to the vehicle.

As shown in FIG. 11, in this embodiment, the recessed storage portion 50 provided in the floorboard member 52 is deep, and securing hooks 58 are provided on a base part 50A. A left and right pair of securing hooks 58 are provided on the base part 50A of the storage portion 50 near the ends thereof in the lateral direction of the vehicle. Hooks 60A formed at both ends of a luggage securing net 60 are detachably engaged with the respective securing hooks 58. Therefore, when luggage is put in the base part 50A of the storage portion 50, the luggage is covered with the luggage securing net 60 so as to be prevented from shifting.

Figure 12:
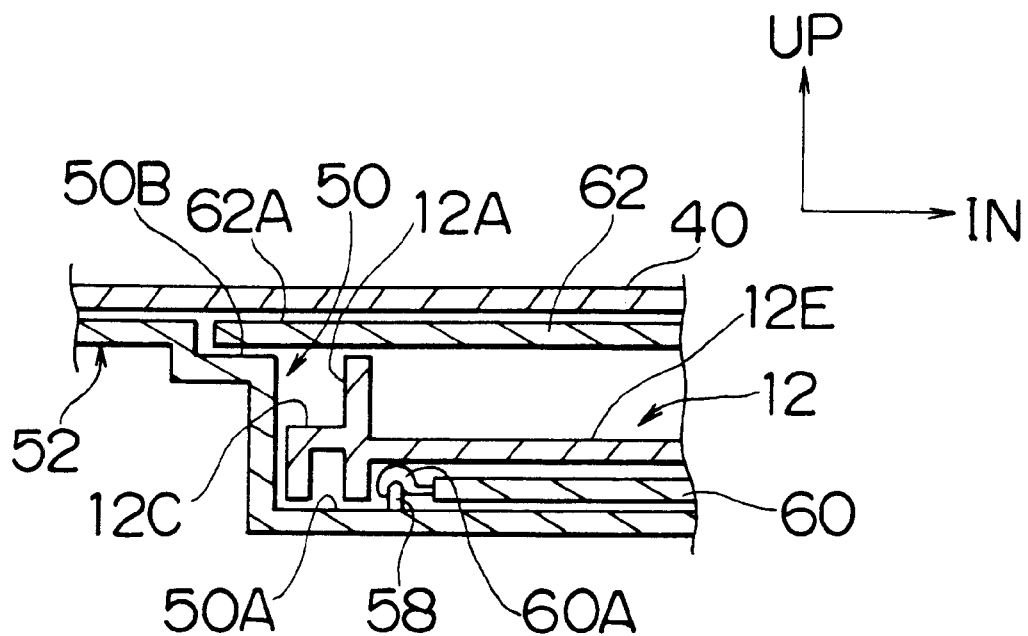
FIG. 12 is an enlarged cross-sectional view taken along line XII—XII in FIG. 11 when the tray is assembled.
Figure 13:
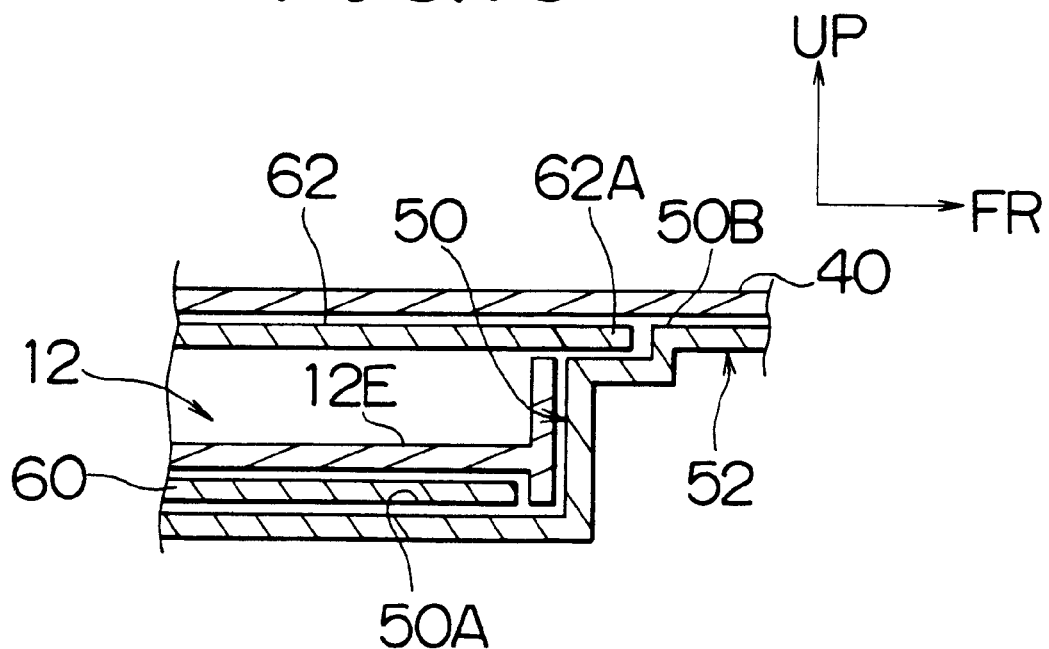
FIG. 13 is an enlarged cross-sectional view taken along line XIII—XIII in FIG. 11 when the tray is assembled.

As shown in FIG. 12, because the base plate 12E of the tray 12 has a raised bottom in this embodiment, the securing hooks 58 and the luggage securing net 60 can be retained under the base plate 12E. As shown in FIGS. 12 and 13, a step 50B is formed near the opening in the storage portion 50. An outer periphery 62A of a board 62 serving as a lid member for closing the storage portion 50 can be engaged with the step 50B and the luggage mat 40 spread on the board 62. Therefore, when the luggage mat 40 is pressed from above, the board 62 supports the luggage mat 40 from below to prevent the luggage mat 40 from becoming damaged. Also, when the tray 12 is removed, the board 62 hides the securing hooks 58 and the luggage securing net 60.

Next, the use of this embodiment will be described.

In this embodiment, in addition to the use of the first embodiment, luggage can be placed in the base part 50A of the storage portion 50 which is situated under the tray 12 accommodated in the storage portion 50. The luggage is covered with the luggage securing net 60 so as to prevent the luggage from rocking and shifting while the vehicle is running. Thus, this structure is also effective for preventing abnormal noise during movement of the vehicle.

Next, a third embodiment of a luggage compartment structure for a vehicle according to the invention will be described with reference to FIGS. 14 through 19.

The same members as those in the first embodiment are designated by the same reference numerals, and the description thereof will be omitted herein.

Figure 14:
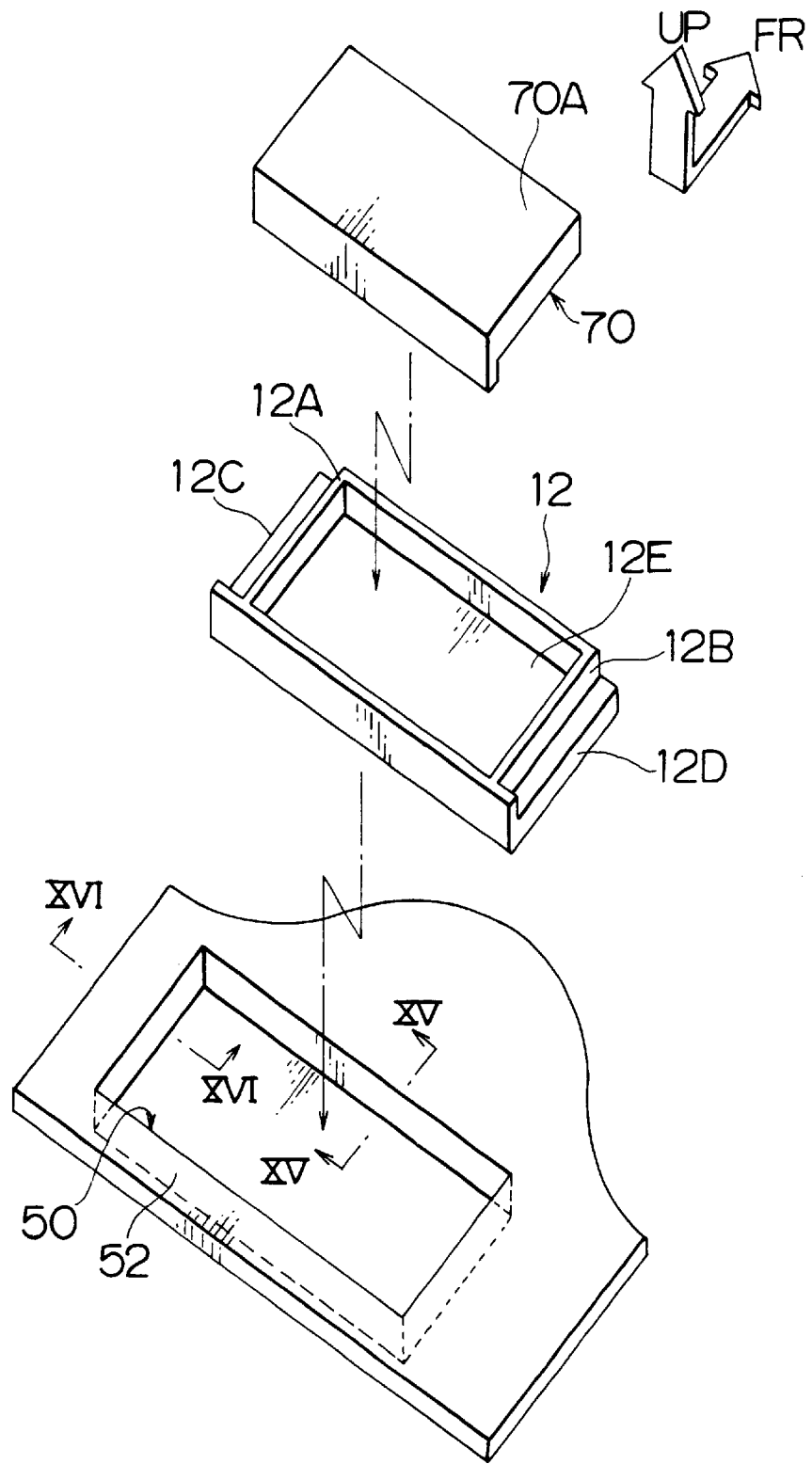
FIG. 14 is a perspective view showing an example of use of a luggage compartment structure for a vehicle according to a third embodiment of the invention, as viewed from behind at an angle to the vehicle.

As shown in FIG. 14, in this embodiment, a small tray 70, which is smaller than the tray 12 and serves as a lid member, is provided in addition to the tray 12 of the first embodiment.

Figure 15:
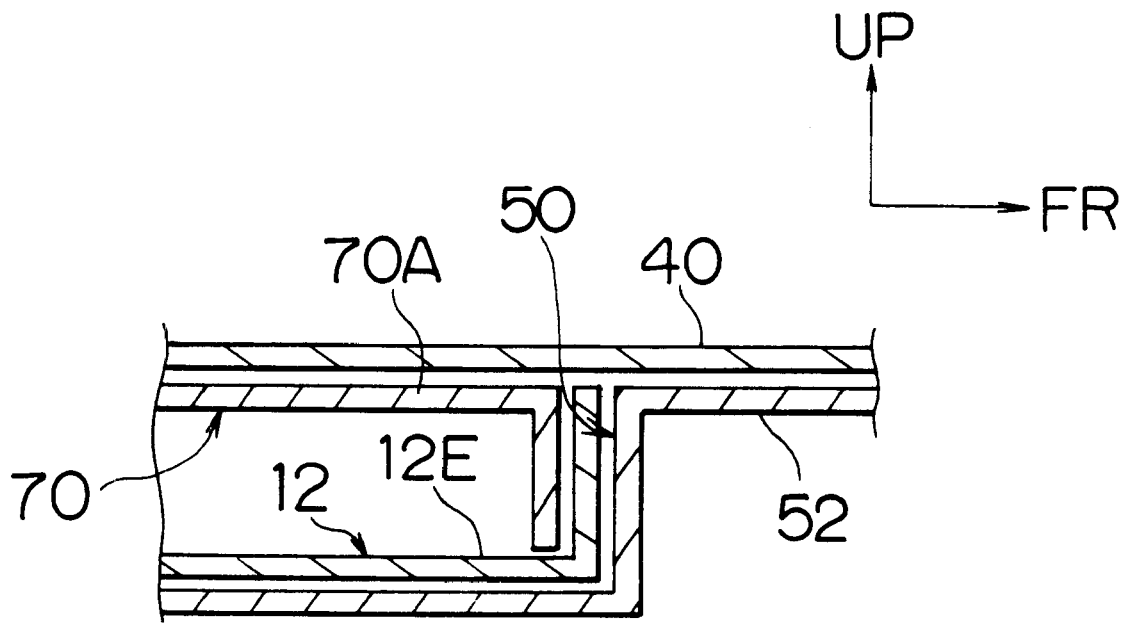
FIG. 15 is an enlarged cross-sectional view taken along line XV—XV in FIG. 14 when the tray is assembled.
Figure 16:
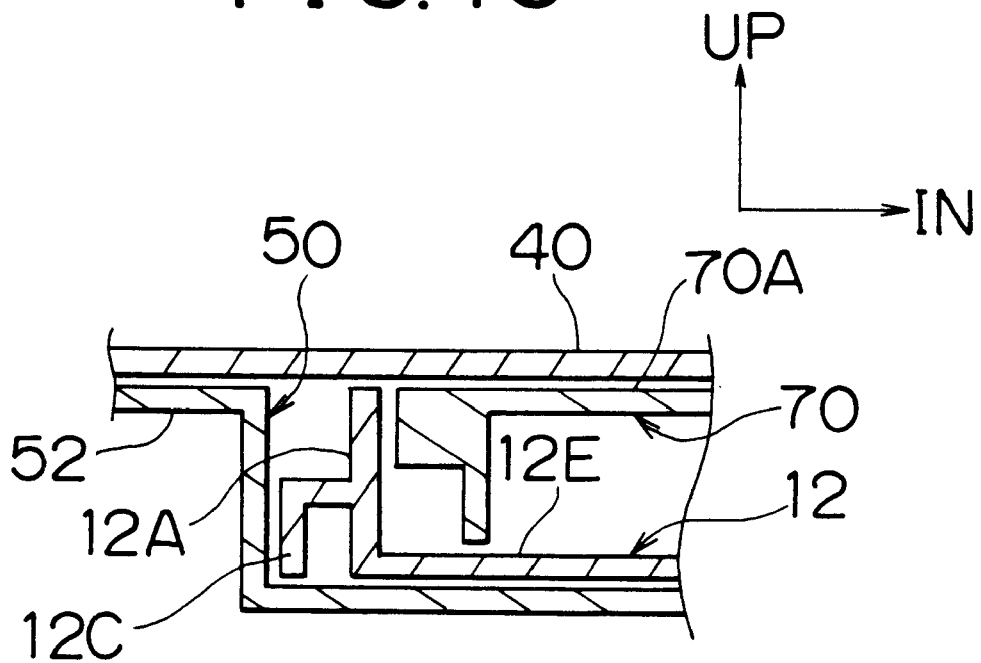
FIG. 16 is an enlarged cross-sectional view taken along line XVI—XVI in FIG. 14 when the tray is assembled.

Thus, the tray 12 and the small tray 70 can be used individually. When the tray 12 and the small tray 70 are not used, the small tray 70 can be placed upside down into the tray 12 while the tray 12 can be accommodated in the storage portion 50, as shown in FIG. 14. In this state, when the luggage mat 40 is pressed from above as shown in FIGS. 15 and 16, the luggage mat 40 is supported from below by a base plate 70A of the small tray 70 so as to prevent the luggage mat 40 from being damaged.

Figure 17:
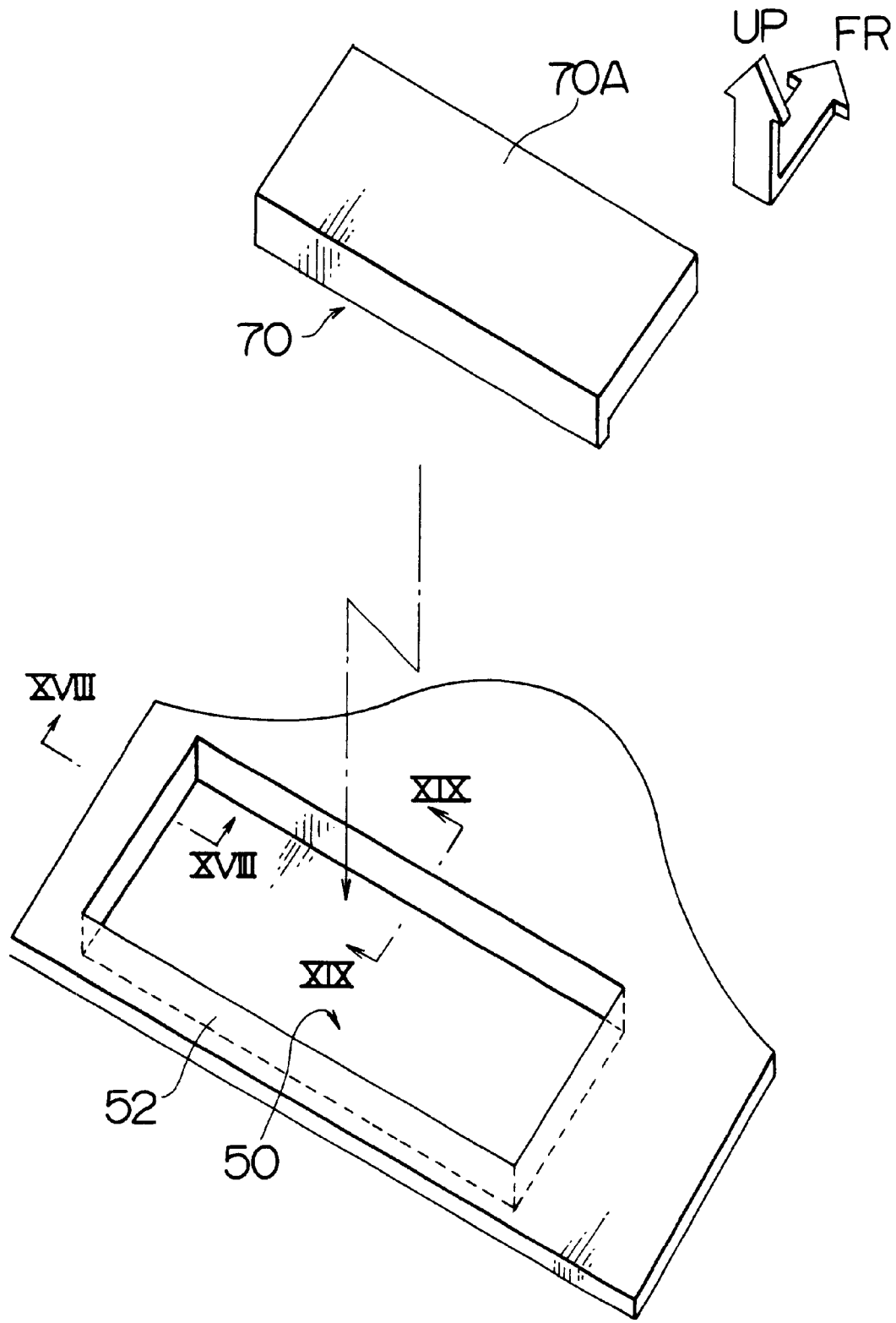
FIG. 17 is a perspective view showing an example of use of a luggage compartment structure for a vehicle according to the third embodiment of the invention, as viewed from behind at an angle to the vehicle.
Figure 20:
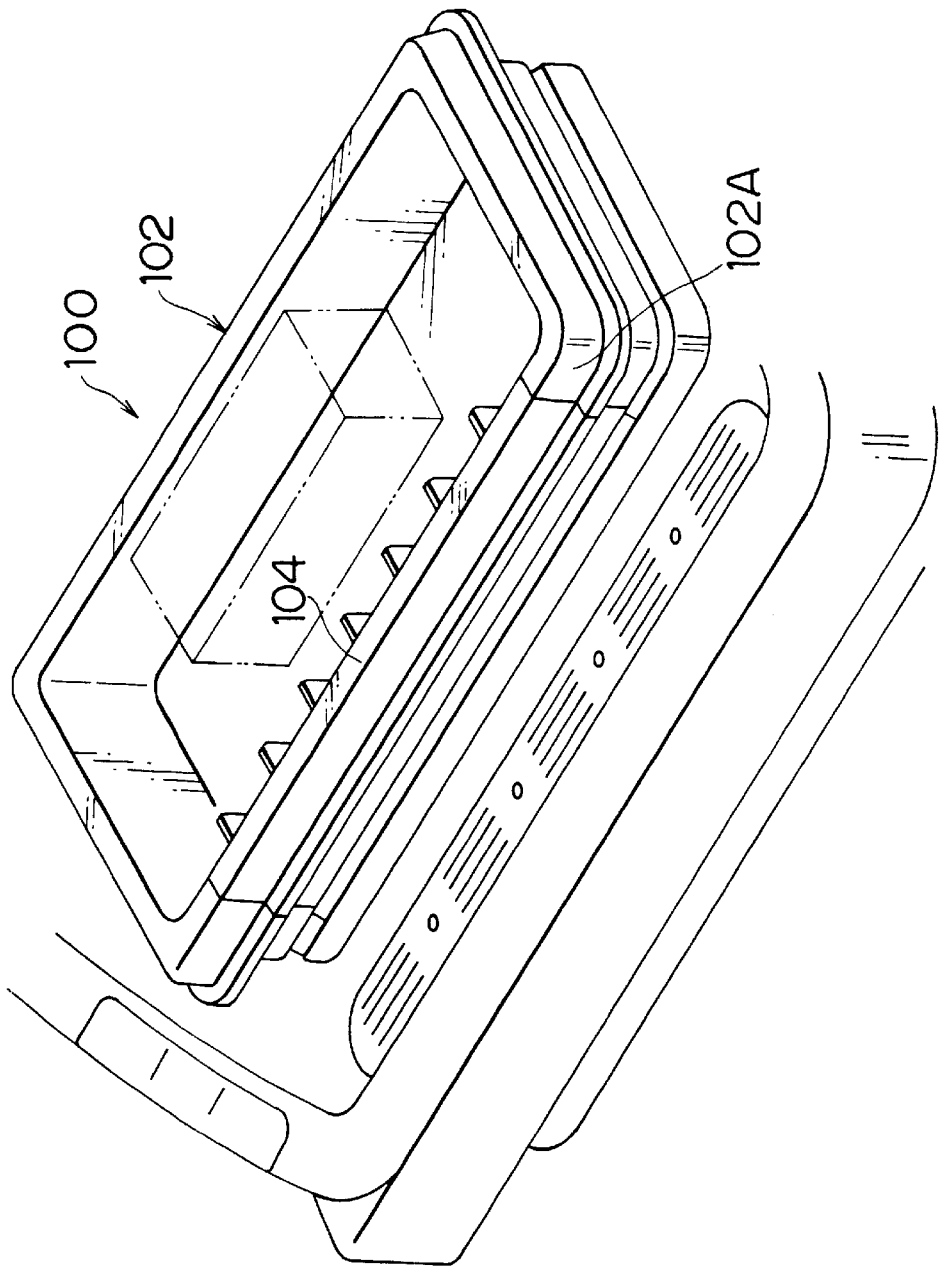
FIG. 20 is a perspective view showing a related art luggage compartment structure for a vehicle.

When the tray 12 is used in another section while the small tray 70 is not used, the small tray 70 can be accommodated in the storage portion 50 (or the tray 12) upside down as shown in FIG. 17. By accommodating the small tray 70 upside down in the storage portion 50, the luggage mat 40 is supported from below by the base plate 70A of the small tray 70, as shown in FIGS. 18 and 19, so as to prevent the luggage mat 40 from being damaged when the luggage mat 40 is pressed from above.

Next, the use of this embodiment will be described.

In this embodiment, in addition to the use of the first embodiment, various ways of using the small tray 70 and the tray 12 can be selected; for example, the small tray 70 and the tray 12 can be used individually, or the small tray 70 and the tray 12 can be used stacked on top of one another. Moreover, the small tray 70 can be placed upside down in the storage portion 50 or in the tray 12 so as to make the upper surface of the tray 12 or the floor surface of the luggage compartment 10 flat, thereby allowing conventional usage of the space of the luggage compartment.

Although the invention has been described in detail with reference to particular embodiments, the invention is not limited thereto. It is apparent to those skilled in the art that various other embodiments are possible in the scope of the invention. For example, the above-described embodiments can be appropriately combined for practice of the invention.

What is claimed is:

1. A luggage compartment structure for a vehicle, comprising:
   a detachable tray having an opening on one side;
   a floorboard member provided below an undersurface of a luggage mat, the floorboard member having a recessed storage portion that can accommodate the detachable tray;
   a luggage compartment having an upper back panel; and
   a lid member positionable to cover an opening of the recessed storage portion so as to provide a substantially flat upper support surface of the floorboard member above the recessed storage portion,
   wherein the tray is detachably placeable on an undersurface of the upper back panel of the luggage compartment and within the recessed storage portion.

2. A luggage compartment structure for a vehicle according to claim 1, wherein the lid member includes a base plate on one side and a partition plate perpendicularly extending from an opposing side of the base plate, and the lid member is sized to be accommodated upside down in the recessed storage portion of the floorboard member or within the opening of the tray.

3. A luggage compartment structure for a vehicle according to claim 1, wherein the lid member includes a small tray having an opening on one side, which can be accommodated upside down in the storage portion of the floorboard member or within the opening of the tray.

4. A luggage compartment structure for a vehicle according to claim 1, wherein the lid member is a base plate of the tray that is accommodated upside down in the recessed storage portion of the floorboard member.

5. A luggage compartment structure for a vehicle according to claim 1, wherein the undersurface of the upper back panel includes opposing guide rails that receive and support the tray.

6. A luggage compartment structure for a vehicle according to claim 5, wherein the tray has laterally protruding guides that mate with the guide rails on the undersurface of the upper back panel.

7. A luggage compartment structure for a vehicle according to claim 5, further comprising a forward facing luggage compartment opening, wherein the tray when placed in the guide rails is positioned above the compartment opening to allow insertion of luggage through the opening without interference with the tray.

8. A luggage compartment structure for a vehicle according to claim 1, further comprising securing hooks in the recessed storage portion.

9. A luggage compartment structure for a vehicle according to claim 8, further comprising a securing net affixable to the securing hooks.

10. A luggage compartment structure for a vehicle according to claim 8, wherein a base plate of the tray is raised allowing the tray to be placed into the recessed storage portion without interference with the securing hooks.

11. A luggage compartment structure for a vehicle according to claim 1, wherein an outer periphery of the recessed storage portion is provided with a step and the lid member is positionable within the recessed storage portion and supported by the step.

12. A luggage compartment structure for a vehicle according to claim 1, wherein the detachable tray has a height less than a depth of the recessed storage portion.

13. A luggage compartment structure for a vehicle, comprising:
a detachable tray having a base, side walls and an opening on a top side;
a floorboard member provided below an undersurface of a luggage mat, the floorboard member having a recessed storage portion sized to accommodate the detachable tray;
a luggage compartment having an upper back panel and a tray support that receivably mounts the detachable tray below the upper back panel; and
a lid member positionable to cover an opening of the recessed storage portion so as to provide a substantially flat upper support surface of the floorboard member above the recessed storage portion,
wherein the tray is detachably placeable on an undersurface of the upper back panel of the luggage compartment and within the recessed storage portion.

14. A luggage compartment structure for a vehicle according to claim 13, wherein the lid member includes a base plate on one side and a partition plate perpendicularly extending from an opposing side of the base plate, and the lid member is sized to be accommodated upside down in the recessed storage portion of the floorboard member or within the opening of the tray.

15. A luggage compartment structure for a vehicle, comprising:
a detachable tray having an opening on one side;
a floorboard member provided below an undersurface of a luggage mat, the floorboard member having a recessed storage portion that can accommodate the detachable tray;
a luggage compartment having an upper back panel; and
a lid member positionable to cover an opening of the recessed storage portion so as to provide a substantially flat upper support surface of the floorboard member above the recessed storage portion,
wherein the tray is detachably placeable over a floor surface on which the luggage mat is spread and within the recessed storage portion.

* * * * *